United States Patent [19]

Yanagioka et al.

[11] 4,099,925
[45] Jul. 11, 1978

[54] APPARATUS FOR DESULFURIZATION OF FLUE GAS

[75] Inventors: Hiroshi Yanagioka, Yokohama; Shinichi Shimizu, Kawasaki; Kouichi Tamura, Yokohama, all of Japan

[73] Assignee: Chiyoda Chemical Engineering & Construction Co., Ltd., Yokohama, Japan

[21] Appl. No.: 834,878

[22] Filed: Sep. 20, 1977

[30] Foreign Application Priority Data

Sep. 29, 1976 [JP]    Japan ................. 51-115981

[51] Int. Cl.² ................. B01J 1/22; C01B 17/00; B01D 53/14
[52] U.S. Cl. ................. 23/285; 23/283; 55/73; 55/87; 55/89; 55/90; 55/95; 55/248; 55/256; 261/121 R; 261/124; 423/242
[58] Field of Search ............ 23/285, 283; 261/121 R, 261/124; 55/73, 87, 89, 90, 95, 248, 256; 423/242

[56] References Cited

U.S. PATENT DOCUMENTS

| | | | |
|---|---|---|---|
| 2,826,601 | 3/1958 | Barsky ................. | 23/283 X |
| 3,130,024 | 4/1964 | Vaughan ................. | 55/248 X |
| 3,230,055 | 1/1966 | Wolfrom ................. | 23/285 |
| 3,495,952 | 2/1970 | Ulbrecht et al. ................. | 23/285 |
| 3,511,615 | 5/1970 | Roget et al. ................. | 23/283 |
| 3,561,194 | 2/1971 | Baldwin et al. ................. | 55/256 X |
| 3,642,452 | 2/1972 | Reget et al. ................. | 23/285 X |
| 3,706,534 | 12/1972 | Verheul et al. ................. | 23/283 X |
| 3,758,277 | 9/1973 | Cook et al. ................. | 23/285 |
| 3,759,669 | 9/1973 | Aaron et al. ................. | 23/283 X |
| 3,867,103 | 2/1975 | Boney et al. ................. | 23/283 X |
| 3,910,771 | 10/1975 | Chapman ................. | 23/285 X |
| 3,989,465 | 11/1976 | Onnen ................. | 23/285 X |

FOREIGN PATENT DOCUMENTS

| | | | |
|---|---|---|---|
| 44-16879 | 7/1969 | Japan ................. | 55/95 |
| 620,043 | 3/1949 | United Kingdom ................. | 23/285 |
| 620,145 | 3/1949 | United Kingdom ................. | 23/285 |

*Primary Examiner*—Barry S. Richman
*Attorney, Agent, or Firm*—Armstrong, Nikaido, Marmelstein & Kubovcik

[57] ABSTRACT

A single-vessel apparatus for desulfurization of flue-gas containing gaseous sulfurous acid, in which the flue gas is contacted with an absorption liquid to thereby have the sulfurous acid content in the flue gas absorbed by said absorption liquid and, at the same time, oxidized by an oxygen-containing gas and further fixed, comprising: a gas dispersing plate member; a weir member; said gas dispersing plate member and said weir member forming in the single vessel first and second zones, the first one being a zone in which the flue gas is contacted with and absorbed by the absorption liquid, the second one being a reservoir of the absorption liquid; a flue gas introduction portion for feeding flue gas from below said gas-dispersing plate member to said first zone; a pipe through which to feed a sulfurous acid gas-fixing agent into the vessel; a pipe for discharging the absorption liquid; a treated gas-discharging outlet; a liquid-raising pipe disposed between a lower portion of said second zone and the flue gas dispersing plate; a pipe for introducing an oxygen-containing gas into the vessel, having a gas outlet below said liquid-raising pipe; and a liquid-dropping zone formed by a weir extending from above said gas-dispersing plate downwardly into the liquid in said second zone. In the apparatus, sulfurous acid gas is simultaneously subjected to both absorption and oxidation in said first zone.

4 Claims, 3 Drawing Figures

APPARATUS FOR DESULFURIZATION OF FLUE GAS

BACKGROUND OF THE INVENTION

The present invention relates to an apparatus for desulfurization of flue gas and, in further detail, an apparatus for desulfurization of flue gas in which the sulfurous acid component in the flue gas is made to contact with and be absorbed by an absorption liquid and simultaneously is oxidized by an oxygen-containing gas and fixed by a fixing reactant in the absorption liquid.

In the wet-type flue gas desulfurization, the method of absorbing sulfurous acid gas and oxidizing it simultaneously with an oxygen-containing gas has been considered as one of the best systems to simplify the equipment from the beginning of development. Its realization has been an important target. A problem in perfecting this system is to cause oxygen to be absorbed since it has an absorption rate lower than sulfurous acid gas. For this reason, conventionally for flue gas of small volume, or for flue gas with sulfurous acid gas concentration of as low as about 100 ppm, an oxygen containing gas is blown into the flue gas to cause absorption and oxidation in the flue gas; no practical technique of applying this knowlege to large volumes of flue gas has been established, heretofore, because equipment would be too large.

OBJECTS OF THE INVENTION

The present invention has been developed in view of the above situation. The object of the present invention is to provide an apparatus which allows the simultaneous absorption and oxidation of sulfurous acid gas, by introducing an oxygen-containing gas gas into a flue gas absorbing zone, and absorbing sulfurous acid gas and oxygen at high rates in said flue gas absorbing zone in the completely mixed state, to cause reaction in the absorption liquid.

BRIEF SUMMARY OF THE INVENTION

To summarize the, the present invention comprises an apparatus for desulfurization of flue gas in which a sulfurous acid component is caused to be contact with and be absorbed by an absorption liquid and simultaneously is oxidized and fixed by a fixing reactant in the absorption liquid, which apparatus comprises, (a) single vessel divided into a flue gas absorption liquid contacting zone and an absorption liquid reservoir zone, by a flue gas dispersing plate and a weir; (b) the lower part of the weir being extended into the absorption liquid reservoir zone, to form a liquid-dropping zone, wherein the absorption liquid overflows from the contacting zone and drops; (c) a flue gas introducing section being provided along the peripheral wall of the absorption liquid reservoir zone, below the flue gas dispersing plate; (d) liquid-raising pipes extending between a lower part of the absorption liquid reservoir zone and the flue gas dispersing plate, oxygen-containing gas introducing pipes with openings below the openings of the lower ends of the liquid-raising pipes and in alignment therewith, fixing reactant introducing means and absorption liquid discharging means respectively being provided in the absorption liquid reservoir zone; and (e) a treated gas discharging plate in the flue gas absorption liquid contacting zone.

DETAILED DESCRIPTION OF THE INVENTION

According to the present invention, the absorption liquid in the lower part of the vessel is raised by the oxygen-containing gas blown into the liquid-raising pipes, and forms a bubble layer with the flue gas introduced separately and the oxygen-containing gas on the flue gas dispersing plate. This bubble layer allows the simultaneous absorption and oxidation of sulfurous acid gas.

The liquid-raising pipes move the oxygen-containing gas in parallel streams to said dispersing plate separately from the flue gas, and raise the absorption liquid in the lower part of the tank onto the dispersing plate, functioning to keep the concentrations of reaction product uniform. In the present invention, where the baffle plates are provided above the flue gas dispersing plate, they serve to mix the liquid containing bubbles of oxygen-containing gas, with the liquid containing bubbles of flue gas on the dispersing plate.

Figure 1:
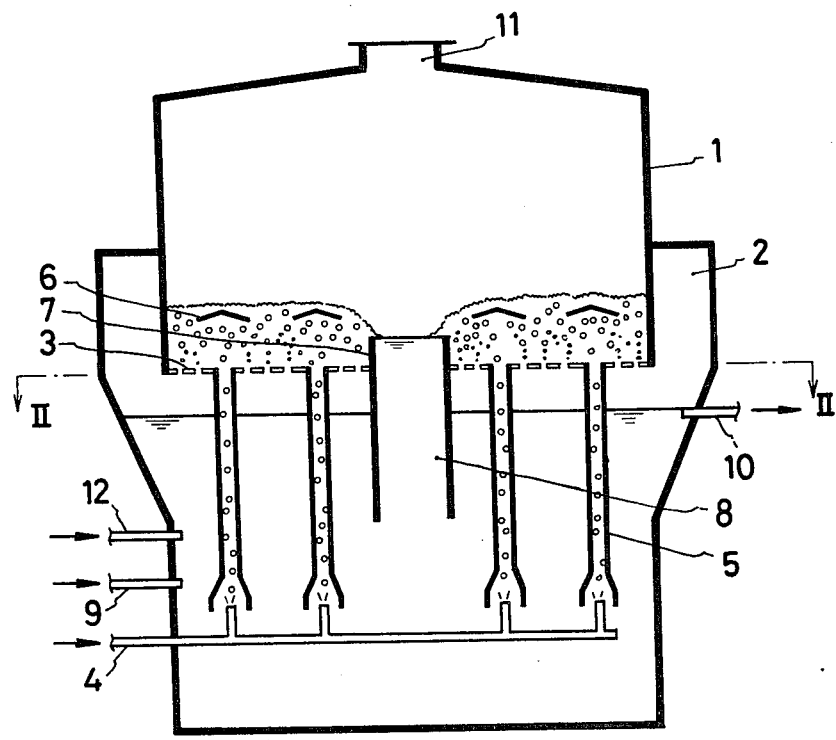
FIGS. 1 and 3 are longitudinal sectional views of apparatus of the embodiments of the present invention.
Figure 2:
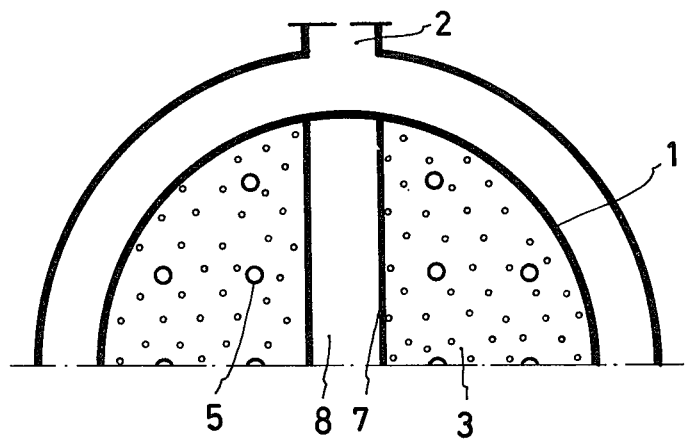
FIG. 2 is a sectional view taken along line II—II of FIG. 1.
Figure 3:
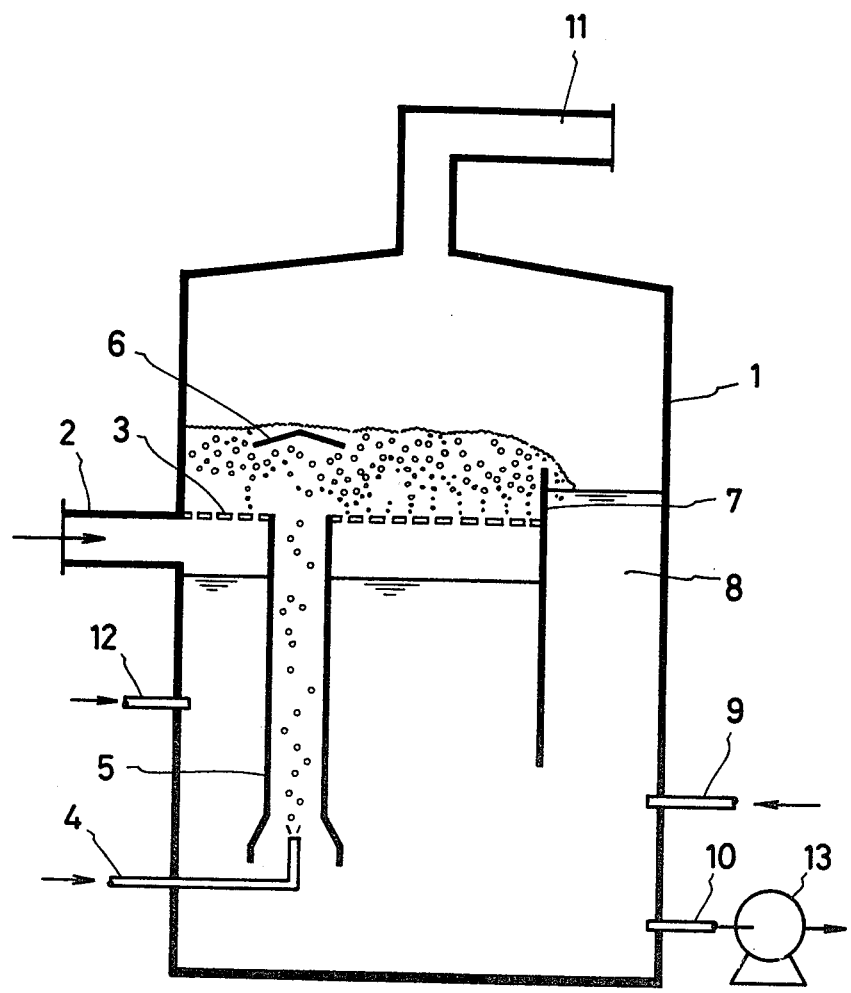

The present invention will be described in reference to the drawings. FIG. 1 and FIG. 3 are longitudinal sectional views of apparatus embodying the present invention. FIG. 2 is a sectional view taken on the line II—II of FIG. 1. In FIG. 1, a flue gas introducing section 2 is provided like a ring around the peripheral wall of a single vessel 1. The flue gas introduced downward from the lower portion of the flue gas introducing section 2, being guided under perforated plate 3, viz. flue gas dispersing plate provided in the liquid of the vessel 1 to flow inside the vessel 1 horizontally along the perforated plate 3. An oxygen-containing gas is blown from introducing pipes 4 having openings below liquid-raising pipes 5 which extend upwardly to the lower part of the vessel 1, into the lower openings of the liquid-raising pipes 5. The gas lifts the absorption liquid from the lower part of the vessel 1, onto the perforated plate 3. After the raised absorption liquid and oxygen-containing gas come onto the perforated plate 3, the oxygen-containing gas and a part of the absorption liquid become foam, and the other excess absorption liquid spreads over the perforated plate 3. The flue gas rises through the holes of the perforated plate 3 and forms with the absorption liquid raised by said liquid-raising pipes a continuous foam layer on the perforated plate 3. The bubbles of said oxygen-containing gas collide with baffle plates 6 positioned above and in alignment with the upper ends of pipes 5, and are dispersed in the foam layer of flue gas. Thus the oxygen-absorbing liquid and the sulfurous acid gas absorbing liquid are completely mixed in the foam layer on the perforated plate 3, and react with each other. The foam flows over a weir 7 and is defoamed, to yield a gas and clear liquid. This clear absorption liquid falls through a liquid-dropping zone 8, to reach the vessel bottom and then the inlet openings of the liquid-raising pipes 5; the liquid is recirculated by the liquid-raising pipes 5, to keep the concentrations of reaction products in the vessel 1 uniform. A fixing reactant, for example, ammonia gas is fed into the vessel 1 from fixing reactant introducing pipes 9, to be dispersed in and absorbed by the liquid. Liquid containing reaction product of the reactant with the flue gas, for example, ammonium sulfate is removed through liquid discharging nozzle 10 which is shown as an overflow for maintaining the liquid level in the vessel constant. The desulfurized flue gas is discharged through a treated-gas discharge outlet 11 above.

In the apparatus of the present invention, a space of 100 – 150 mm is provided between the absorption liquid and the disposition plate 3 above. This facilitates the introduction and dispersion of the flue gas. In an apparatus with no space under the flue gas dispersing plate, flue gas must be introduced against liquid pressure particularly at the flue gas introducing section, and large pressure drop of flue gas is inevitable. This is a drawback to be avoided. Furthermore, also with regard to the dispersion of flue gas under the dispersing plate, the effect equal to the gas dispersion state obtained with the flue gas pressure drop of 100 to 150 mm water column is produced. It is not necessary to provide ducts inside the vessel to disperse gas under the flue gas dispersing plate. Since the above means makes it possible to limit the pressure drop of the flue gas in the introducing section and the foam layer to 200 – 300 mm of water, the flue gas at the flue gas introducing section is not required to be of high pressure. This means is very effective also for treating a large volume of flue gas.

With regard to the weir provided to keep the liquid pressure balance between the foam layer on the dispersing plate and the liquid-dropping zone, its height $H_{weir}$ is only required to be greater than the height corresponding to the differential pressure between the liquid pressure $H_F$ mm water column on the dispersing plate and the head $h$ mm water column of the liquid-raising pipes, as shown by the following formula:

$$H_{weir} \geq H_F - h$$

In general, it is preferred that the height of the weir be 50 to 80% of the height of the liquid phase continuous bubble layer.

In addition, the liquid-raising pipes allow circulation of sufficient absorption liquid to make the concentrations of reaction product such as ammonium sulfate in the vessel uniform. The relation between the amount of oxygen-containing gas V m³/hr and the amount of liquid raised by the liquid-raising pipes Q m³/hr is expressed by the following formula:

$$V = \left( \frac{4.20\ h}{\eta \log \frac{hs + 10.33}{10.33}} \right) Q$$

where
$\eta$: efficiency in %
$h$: head in meters
$hs$: submergence depth of liquid-raising pipes in meters.

In general, for liquid-raising pipes, the submergence ratio $\sigma$ is expressed by $\sigma = h/(h + hs)$, and it is known that the efficiency is in the relation, $\eta = f(V, \sigma)$. Therefore, if V and $\sigma$ are selected to make $\eta$ constant, Q is directly determined. If the volume of flue gas is constant, the amount of oxygen-containing gas V is proportional to the sulfurous acid gas concentration in the flue gas. For this reason, the circulating amount Q of absorption liquid is proportional to the sulfurous acid gas concentration, and the concentrations of reaction product such as ammonium sulfate in the vessel are held uniform, irrespective of the sulfurous acid gas concentration. Therefore, for the flue gas with high sulfurous acid gas concentration, any auxiliary means such as pump for liquid circulation is not required. Thus, the apparatus of the present invention can easily meet a wide range of sulfurous acid gas concentrations in flue gases and allows operation just by blowing an oxygen-containing gas and introducing a flue gas, without requiring any other means for liquid circulation. Furthermore, if many combination units, each of which consists of liquid-raising pipes and a liquid-dropping zone, are arranged horizontally in the vessel, the apparatus can meet the changes of flue gas treating volume. Thus, the present invention permits the ready scale-up of equipment.

Since liquid-raising pipes are used, the apparatus of the present invention can efficiently use suspended solid containing absorption liquid, and can be applied efficiently not only to the flue gas desulfurizaton using ammonia as fixing reactant, but also for the flue gas desulfurization by an aqueous solution or suspension which contains any substance to absorb and fix sulfurous acid gas. Thus the apparatus has wide application.

For example, if the absorption liquid is an aqueous solution, NaOH (caustic soda) can be used as well as ammonia fixing reactant, to allow the production of $Na_2SO_4$ as a byproduct in desulfurization. If the absorption liquid is a suspension, this apparatus can be applied to the ammonium sulfate process in which ammonium sulfate is concentrated and precipitated as crystals. This ammonium sulfate crystallization can easily be carried out by forming the vessel bottom conical and providing air-blowing nozzles for stirring.

In an Example to follow, a perforated plate is used as the flue gas dispersing plate, but a net, grid or sieve plate can properly be used.

FIG. 3 shows a simplified experimental embodiment of the present invention, in which a liquid-raising pipe and a liquid-dropping zone are eccentrically provided in a single vessel, and an absorption liquid discharging nozzle is provided at the bottom of the vessel. The symbols of the respective portions are same as those of FIG. 1.

Below will be shown an experimental example using the apparatus shown in FIG. 3.

EXAMPLE

The apparatus used was as shown in FIG. 3. The diameter of the cylindrical apparatus was 800 mm, and the liquid level was 1,350 mm in height. The liquid-raising pipe 5 was 1,000 mm in length and 80 mm in diameter. The liquid-dropping zone 8 was 650 mm in height from the liquid level, and the weir was 200 mm in height from the flue gas dispersing plate 3. The clearance between liquid level and the perforated plate was 150 mm. The opening ratio of the perforated plate was 7%, and the hole diameter was 10 mm. The baffle plate 6 was provided at 300 mm above the perforated plate.

Air was blown into the liquid-raising pipe 5 from the oxygen-containing gas introducing pipe 4 at 16 Nm³/hr, and on the other hand, the flue gas containing 1,280 ppm of $SO_2$ and 3% of $O_2$ was blown from the flue gas introducing section 2 at 980 Nm³/hr. Furthermore, ammonia gas was supplied from the fixing reactant introducing pipe 9 at 25 Nm³/hr to adjust pH of absorption liquid to 3.

Desulfurization gas (containing 10–20 ppm of $SO_2$) was discharged from the treated gas discharging outlet 11. Industrial water was supplied from the water supply nozzle 12, to adjust ammonium sulfate concentration and liquid level. The absorption liquid was drawn out through the absorption liquid discharging nozzle 10 by the pump 13. The amount of absorption liquid drawn out was 31 l/hr, and the ammonium sulfate concentration was 20% by weight.

The total pressure drop of flue gas was 300 mm water column, and the height of the bubble layer at this time was 700 mm.

As obvious from the above description, the present invention gives the results that the absorption and oxidation of sulfurous gas can be carried out simultaneously by very compact equipment using the same amount of oxidizing air as conventionally; that a reaction product as a by-product, for example, ammonium sulfate, can be concentrated, too, and that high desulfurization performance can be attained at low pressure loss.

What is claimed is:

1. An apparatus for desulfurization of flue gas, in which a sulfurous acid gas-containing flue gas is contacted with an absorption liquid to have the sulfurous acid gas absorbed by said absorption liquid and simultaneously oxidized by an oxygen-containing gas and fixed by a fixing reactant in the absorption liquid, which comprises: (a) a single vessel divided by a flue gas-dispersing plate and a weir into an upper flue gas-absorption liquid contacting zone and a lower absorption liquid reservoir zone; (b) a liquid-dropping zone formed by a lower portion of the weir extended to the absorption liquid reservoir zone, wherein the absorption liquid overflows from the contacting zone and drops; (c) a flue gas-introducing section provided along the peripheral wall of the absorption liquid reservoir zone and located below the flue gas-dispersing plate; (d) liquid-raising pipes connected between the lower part of the absorption liquid reservoir zone and the flue gas-dispersing plate, oxygen-containing gas introducing pipes with openings below the openings of the lower end of the liquid-raising pipes and in alignment therewith, fixing reactant-introducing means and absorption liquid-discharging means, respectively provided in the absorption liquid reservoir zone; and (e) a treated gas discharging outlet provided above the flue gas-dispersing plate in the flue gas-absorption liquid contacting zone.

2. An apparatus according to claim 1, wherein the height of the weir above said flue gas-dispersing plate is 50 to 80% of the height of the liquid phase-continuous bubble layer formed on the dispersing plate.

3. An apparatus according to claim 1, wherein baffle plates are provided in the liquid phase-continuous bubble layer formed on the dispersing plate, said baffle plates being in alignment with the upper ends of said liquid-raising pipes.

4. An apparatus according to claim 1, wherein the flue gas-dispersing plate is a perforated plate, net, grid or sieve plate.

* * * * *